US011738704B2

(12) United States Patent
Lee et al.

(10) Patent No.: US 11,738,704 B2
(45) Date of Patent: Aug. 29, 2023

(54) UNDERRIDE GUARD ASSEMBLY FOR TRAILERS

(71) Applicant: Great Dane LLC, Chicago, IL (US)

(72) Inventors: Christian S. Lee, Pooler, GA (US); Younghag Choi, Pooler, GA (US); SoonDong Jung, Richmond Hill, GA (US)

(73) Assignee: Great Dane LLC, Chicago, IL (US)

( * ) Notice: Subject to any disclaimer, the term of this patent is extended or adjusted under 35 U.S.C. 154(b) by 24 days.

(21) Appl. No.: 17/216,002

(22) Filed: Mar. 29, 2021

(65) Prior Publication Data

US 2021/0309176 A1    Oct. 7, 2021

Related U.S. Application Data

(60) Provisional application No. 63/004,387, filed on Apr. 2, 2020.

(51) Int. Cl.
*B60R 19/56* (2006.01)
*B60R 19/02* (2006.01)
*B62D 53/06* (2006.01)

(52) U.S. Cl.
CPC .......... *B60R 19/565* (2013.01); *B60R 19/023* (2013.01); *B62D 53/06* (2013.01)

(58) Field of Classification Search
CPC ..... B60R 19/565; B60R 19/023; B62D 53/06; B62D 35/001
USPC ....................................... 296/180.4; 293/128
See application file for complete search history.

(56) References Cited

U.S. PATENT DOCUMENTS

| 5,507,546 | A  | 4/1996 | Holley |
| 6,068,329 | A  | 5/2000 | Miller |
| 6,116,667 | A  | 9/2000 | Torcomian |
| 6,179,544 | B1 | 1/2001 | Weseman |
| 6,450,556 | B1 | 9/2002 | Jacobs |
| 6,604,765 | B1 | 8/2003 | Eull |
| 6,814,378 | B1 | 11/2004 | Marmur |
| 7,086,674 | B2 | 8/2006 | Goertz |
| 7,093,889 | B2 | 8/2006 | Graham |
| 7,163,258 | B2 | 1/2007 | Dyer, II et al. |
| 7,188,875 | B2 | 3/2007 | Norelius |
| 7,461,850 | B2 | 12/2008 | Kurth |
| 7,578,541 | B2 | 8/2009 | Layfield et al. |
| 7,665,795 | B2 | 2/2010 | Shishikura |
| 7,686,385 | B2 | 3/2010 | Dolan et al. |
| 7,699,382 | B2 | 4/2010 | Roush et al. |
| 7,748,772 | B2 | 7/2010 | Boivin et al. |
| 7,780,224 | B2 | 8/2010 | Roush |
| 7,789,453 | B2 | 9/2010 | Roush et al. |
| 7,828,368 | B2 | 11/2010 | Ortega et al. |

(Continued)

FOREIGN PATENT DOCUMENTS

| CA | 3038385 | 10/2010 |
| WO | WO2009022904 | 2/2009 |

(Continued)

*Primary Examiner* — Joseph D. Pape
(74) *Attorney, Agent, or Firm* — Nelson Mullins Riley & Scarborough LLP

(57) ABSTRACT

A semi-trailer is provided, including a wheeled chassis having at least one wheeled axle at a rearward end and a retractable support at a forward end, a body comprising a cargo deck and an underride guard assembly that is movable in response to an upward force applied thereto.

24 Claims, 10 Drawing Sheets

(56) References Cited

U.S. PATENT DOCUMENTS

| | | |
|---|---|---|
| 7,887,120 B2 | 2/2011 | Boivin et al. |
| 7,938,475 B2 | 5/2011 | Boivin et al. |
| 7,942,467 B2 | 5/2011 | Boivin et al. |
| 7,942,468 B2 | 5/2011 | Boivin et al. |
| 7,942,469 B2 | 5/2011 | Boivin et al. |
| 7,942,470 B2 | 5/2011 | Boivin et al. |
| 7,942,471 B2 | 5/2011 | Boivin et al. |
| 7,950,721 B1 | 5/2011 | Peterson |
| 8,087,715 B2 | 1/2012 | Andrus et al. |
| 8,162,384 B2 | 4/2012 | Giromini et al. |
| 8,177,286 B2 | 5/2012 | Brown et al. |
| 8,191,956 B1 | 6/2012 | Dixon, Jr. et al. |
| 8,276,972 B2 | 10/2012 | Domo et al. |
| 8,292,351 B2 | 10/2012 | Boivin et al. |
| 8,322,778 B1 | 12/2012 | Pfaff |
| 8,336,950 B2 | 12/2012 | Andrus et al. |
| 8,366,180 B2 | 2/2013 | Lee et al. |
| 8,376,450 B1 | 2/2013 | Long et al. |
| 8,398,150 B2 | 3/2013 | Brown et al. |
| 8,449,017 B2 | 5/2013 | Boivin et al. |
| 8,579,359 B2 | 11/2013 | Brown et al. |
| 8,616,616 B2 | 12/2013 | van Raemdonck |
| 8,678,474 B1 | 3/2014 | Boivin et al. |
| 8,783,758 B2 | 7/2014 | Baker |
| 8,801,078 B2 | 8/2014 | Brown et al. |
| 8,919,863 B2 | 12/2014 | Layfield et al. |
| 8,950,793 B2 | 2/2015 | Deighton |
| 8,973,973 B2 | 3/2015 | Kronemeyer |
| 9,004,575 B2 | 4/2015 | Grandominico et al. |
| 9,045,176 B1 | 6/2015 | Henderson, II |
| 9,139,240 B1 | 9/2015 | Long |
| 9,139,241 B1 | 9/2015 | Smith |
| 9,199,676 B2 | 12/2015 | Brown et al. |
| 9,248,872 B2 | 2/2016 | White |
| 9,272,741 B2 | 3/2016 | Gerst |
| 9,296,433 B2 | 3/2016 | Roush |
| 9,352,714 B2 | 5/2016 | Batzer et al. |
| 9,409,610 B2 | 8/2016 | Baker et al. |
| 9,440,688 B2 | 9/2016 | Smith et al. |
| 9,440,689 B1 | 9/2016 | Smith et al. |
| 9,463,759 B1 | 10/2016 | Kiefer |
| 9,487,171 B2 | 11/2016 | Rogers et al. |
| 9,573,636 B2 | 2/2017 | Grandominico et al. |
| 9,669,883 B2 | 6/2017 | Bassily et al. |
| 9,669,884 B2 | 6/2017 | Bassily et al. |
| 9,688,320 B2 | 6/2017 | Courtney et al. |
| 9,764,781 B2 | 9/2017 | Bezner |
| 9,809,260 B2 | 11/2017 | Smith |
| 9,908,493 B1 | 3/2018 | Kiefer |
| 9,919,749 B2 | 3/2018 | Baker et al. |
| 9,919,750 B2 | 3/2018 | Baker et al. |
| 9,969,445 B2 | 5/2018 | Persson |
| 10,940,817 B2 | 3/2021 | Kunkel et al. |
| 10,946,824 B2 | 3/2021 | Kunkel et al. |
| 2005/0146161 A1 | 7/2005 | Uland |
| 2008/0116702 A1 | 5/2008 | Enz et al. |
| 2011/0062749 A1* | 3/2011 | Graham ............ B62D 35/001 296/180.4 |
| 2011/0233960 A1 | 9/2011 | Heinz |
| 2012/0169086 A1 | 7/2012 | Giromini et al. |
| 2012/0319428 A1 | 12/2012 | Wood |
| 2013/0076064 A1 | 3/2013 | Smith et al. |
| 2014/0009277 A1 | 1/2014 | Lesesky |
| 2014/0145467 A1 | 5/2014 | Ellis |
| 2014/0159419 A1 | 6/2014 | Baker et al. |
| 2014/0210226 A1 | 7/2014 | Cobb |
| 2014/0265438 A1* | 9/2014 | Kronemeyer ........ B62D 35/001 296/180.4 |
| 2014/0265439 A1* | 9/2014 | White ............... B62D 35/001 296/180.4 |
| 2014/0300134 A1 | 10/2014 | Gerst |
| 2015/0259014 A1 | 9/2015 | Baker et al. |
| 2016/0101752 A1 | 4/2016 | Batzer |
| 2017/0057563 A1 | 3/2017 | Baker et al. |
| 2017/0066487 A1 | 3/2017 | Boivin et al. |
| 2017/0088199 A1 | 3/2017 | Smith et al. |
| 2017/0120965 A1 | 5/2017 | Grandominico et al. |
| 2017/0129433 A1 | 5/2017 | Keane et al. |
| 2018/0050742 A1 | 2/2018 | Smith et al. |
| 2018/0093719 A1 | 4/2018 | Emery et al. |
| 2018/0099632 A1 | 4/2018 | Fortier |
| 2018/0118143 A1 | 5/2018 | Ponder |
| 2018/0244228 A1 | 8/2018 | Desjardins |
| 2018/0281875 A1 | 10/2018 | Macherel et al. |
| 2018/0290695 A1 | 10/2018 | Macherel et al. |
| 2018/0304941 A1 | 10/2018 | Ehrlich et al. |
| 2018/0319442 A1 | 11/2018 | Macherel et al. |
| 2019/0077470 A1 | 3/2019 | Kunkel et al. |
| 2019/0184925 A1 | 6/2019 | Roush et al. |
| 2019/0256026 A1 | 8/2019 | Kunkel et al. |

FOREIGN PATENT DOCUMENTS

| | | |
|---|---|---|
| WO | WO2010120985 | 10/2010 |
| WO | WO2013043890 | 3/2013 |
| WO | WO2013142818 | 9/2013 |
| WO | WO2015117940 | 8/2015 |
| WO | WO2017058270 | 4/2017 |
| WO | WO2017058271 | 4/2017 |
| WO | WO2017058272 | 4/2017 |
| WO | WO2017059327 | 4/2017 |
| WO | WO2017059330 | 4/2017 |
| WO | WO2017059332 | 4/2017 |
| WO | WO2018097815 | 5/2018 |
| WO | WO2018097991 | 5/2018 |

* cited by examiner

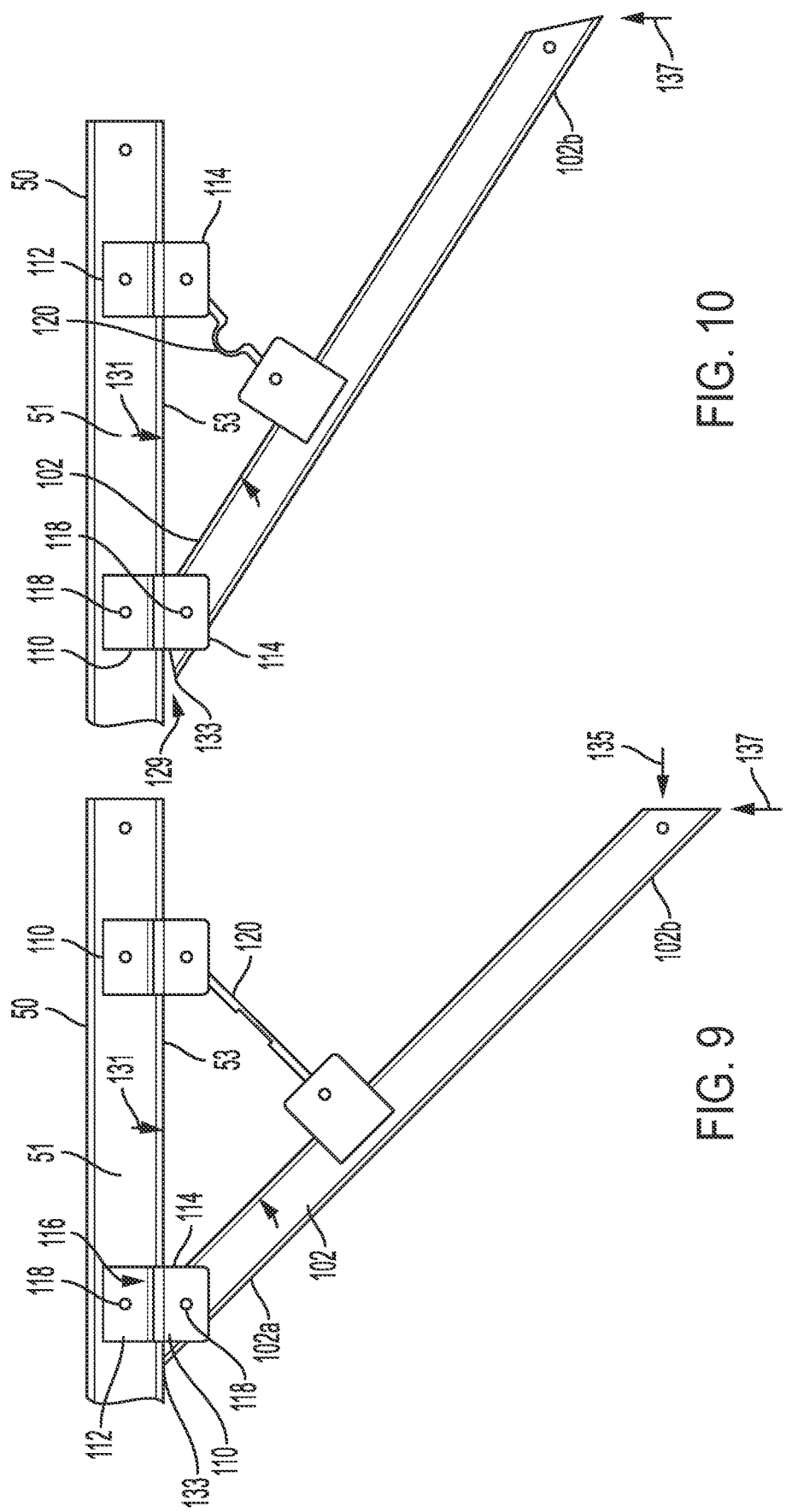

UNDERRIDE GUARD ASSEMBLY FOR TRAILERS

CROSS-REFERENCE TO RELATED APPLICATION

This application claims priority to U.S. Provisional Patent Application No. 63/004,387, filed Apr. 2, 2020, wherein the contents of the foregoing is incorporated herein in its entirety by reference.

TECHNICAL FIELD

Example embodiments generally relate to cargo carrying trailers and, in particular, to trailers having side underride assemblies.

BACKGROUND

A wide variety of trailers are known for carrying cargo. For example, a semi-trailer has one or more wheeled axles at the trailer's rear but no wheeled axle at the trailer's forward end, which instead may have a set of retractable legs to support the trailer when not attached to a tractor. A semi-trailer's forward end may have a kingpin to be received in a tractor's fifth wheel, as should be understood. A van type of semi-trailer typically includes a deck assembly supported by a side wall structure, wheels, and retractable front legs. The deck assembly may include longitudinal floor boards and transverse cross-members, such as I-beams, extending between opposing bottom rails. The deck transfers its load to the bottom rails, wheels, and, depending upon whether or not the trailer is coupled to a tractor or is free-standing, to a tractor fifth wheel or to retractable front supports.

SUMMARY

According to an example embodiment, a semi-trailer has a wheeled chassis having a forward end, a rearward end, a first side extending between the forward end and the rearward end, a second side extending between the forward end and the rearward end opposite the first side, at least one wheeled axle at the rearward end, and a retractable support at the forward end. The wheeled chassis is elongated in a longitudinal dimension from the forward end to the rearward end. A cargo deck is supported by the wheeled chassis. An underride guard assembly attached to the wheeled chassis has at least one first rail disposed below the first side within a first space located forward of wheels of the at least one wheeled axle and rearward of the retractable support. The first rail extends over at least half of the distance between the wheels and the retractable support in the longitudinal dimension. The first rail is pivotably attached to the wheeled chassis so that the first rail is pivotable, from a first position with respect to the wheeled chassis and away from a center of the wheeled chassis between the first side and the second side, upon application of an upward force to the first rail and is pivotable back to the first position of the first rail in absence of the upward force to the first rail. A stop is disposed operatively between the first rail and the wheeled chassis that blocks the first rail from pivoting inward from the first position toward the center in response to application of the upward force to the first rail.

In a further embodiment, a semi-trailer has a wheeled chassis having a forward end, a rearward end, a first side extending between the forward end and the rearward end, a second side extending between the forward end and the rearward end opposite the first side, at least one wheeled axle at the rearward end, and a retractable support at the forward end. The wheeled chassis is elongated in a longitudinal dimension from the forward end to the rearward end. A cargo deck is supported by the wheeled chassis. An underride guard assembly attached to the wheeled chassis has an elongated first brace member and an elongated second brace member, each having a first end pivotably attached to the wheeled chassis and a second end opposite the first end. Each of the first brace member and the second brace member extends from the first end thereof to the second end thereof downwardly from the wheeled chassis and outwardly away from a center of the wheeled chassis between the first side and the second side. A rail extends between the second ends of the first brace member and the second brace member. Each of the first brace member and the second brace member is pivotable upwardly about an axis passing through the first end of the first brace member and the first end of the second brace member.

In a still further embodiment, a semi-trailer has a wheeled chassis having a forward end, a rearward end, a first side extending between the forward end and the rearward end, a second side extending between the forward end and the rearward end opposite the first side, at least one wheeled axle at the rearward end, and a retractable support at the forward end. The wheeled chassis is elongated in a longitudinal dimension from the forward end to the rearward end. A cargo deck is supported by the wheeled chassis. An underride guard assembly has an elongated first brace member and an elongated second brace member, each having a first end pivotably attached to the wheeled chassis and a second end opposite the first end. Each of the first brace member and the second brace member extends from the first end thereof to the second end thereof downwardly from the wheeled chassis and outwardly away from a center of the wheeled chassis between the first side and the second side. At least one horizontally elongated web is connected to and extends between the second ends of the first brace member and the second brace member. Each of the first brace member and the second brace member is pivotable upwardly about an axis passing through the first end of the first brace member and the first end of the second brace member.

The accompanying drawings, which are incorporated in and constitute a part of this specification, illustrate one or more embodiments of the invention and, together with the description, serve to explain the principles of the disclosure herein.

BRIEF DESCRIPTION OF THE DRAWINGS

The disclosure herein references the accompanying drawings, in which some, but not all embodiments of the disclosure are shown. Indeed, the subject matter of the present disclosure may be embodied in many different forms and should not be construed as limited to the embodiments set forth herein.

FIG. 9 is a partial side view of the underride guard assembly of the trailer as in FIG. 1 in a first position;

FIG. 10 is a partial view of the underride guard assembly of the trailer as in FIG. 1 in a second position;

Figure 1:
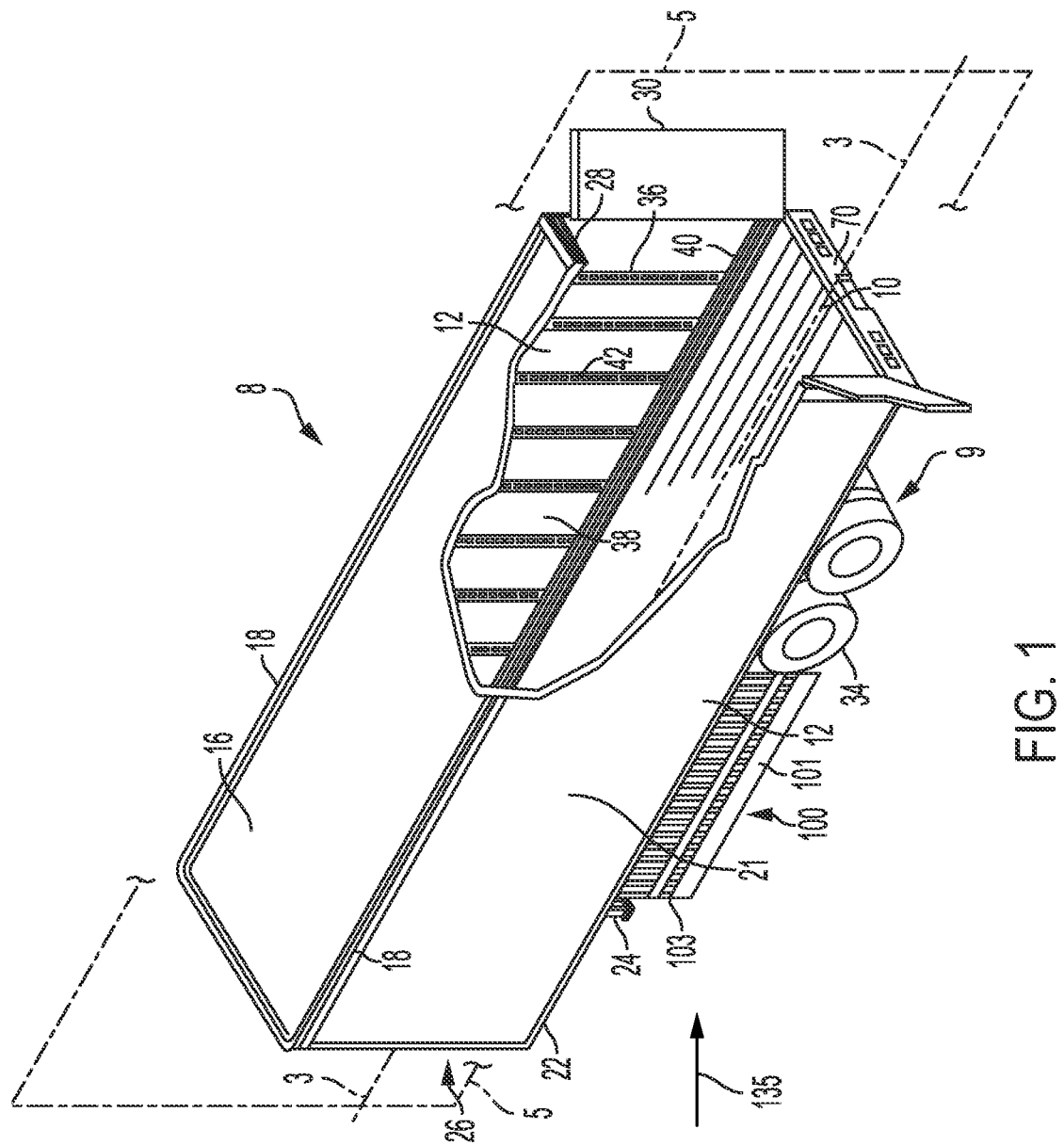
FIG. 1 is a perspective view of a semi-trailer having an underride guard assembly in accordance with an embodiment of the present invention.

Repeat use of reference characters in the present specification and drawings is intended to represent same or analogous features or elements of the present disclosure.

DETAILED DESCRIPTION

Reference will now be made in detail to present embodiments of the disclosure, one or more examples of which are illustrated in the accompanying drawings. Each example is provided by way of explanation of the disclosure, not limitation of the disclosure. In fact, it will be apparent to those skilled in the art that modifications and variations can be made in the present disclosure without departing from the scope or spirit thereof. For instance, any number of features illustrated or described as part of one embodiment may be used on another embodiment, in any combination, to yield a still further embodiment. Thus, it is intended that the present disclosure covers such modifications and variations as come within the scope of the appended claims and their equivalents.

It should be understood that terms of orientation, e.g. "forward," "rearward," "upper," "lower," and similar terms as used herein are intended to refer to relative orientation of components of the devices described herein with respect to each other under an assumption of a consistent point of reference but do not require any specific orientation of the overall system. Thus, for example, the discussion herein may refer to a "forward" or "front" end of semi-trailer, referring to a direction toward the end of the trailer that has the kingpin that is received by a fifth wheel at the "rearward" or "rear" end of a tractor, or a "rearward" end of the trailer, referring to a direction toward the trailer's rear, at which the rear frame and doors are disposed. The present discussion may also refer to "upper" and/or "lower" surfaces of the trailer and/or its components, generally with regard to the orientation of the trailer as shown in FIG. 1. Terms such as "horizontal" and "vertical," for example, refer to orientations under an assumption that a semi-trailer as in FIG. 1 is disposed in its operative position, such as shown at FIG. 1, on a level, horizontal surface. Such terms may be used in the present disclosure and claims and will be understood to refer to a relative orientation but not to an orientation of the trailer with respect to an external frame of reference. Further, the term "end" should be understood to encompass a part of something and inward of a boundary or edge thereof, rather than just the boundary or edge.

Further, either of the terms "or" and "one of and," as used in this disclosure and the appended claims, is intended to mean an inclusive "or" rather than an exclusive "or." That is, unless specified otherwise, or clear from the context, either of the phrases "X employs A or B" and "X employs one of A and B" is intended to mean any of the natural inclusive permutations. That is, either phrase is satisfied by any of the following instances: X employs A; X employs B; or X employs both A and B, and this is true of similar phrases, such as "at least one of A or B" or "at least one of A and B," that may be utilized in the specification or claims. In addition, the articles "a" and "an" as used in this application and the appended claims should generally be construed to mean "one or more" unless specified otherwise or clear from the context to be directed to a singular form. Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" may include plural references, and the meaning of "in" may include "in" and "on." The phrase "in one embodiment," as used herein does not necessarily refer to the same embodiment, although it may.

Figure 3:
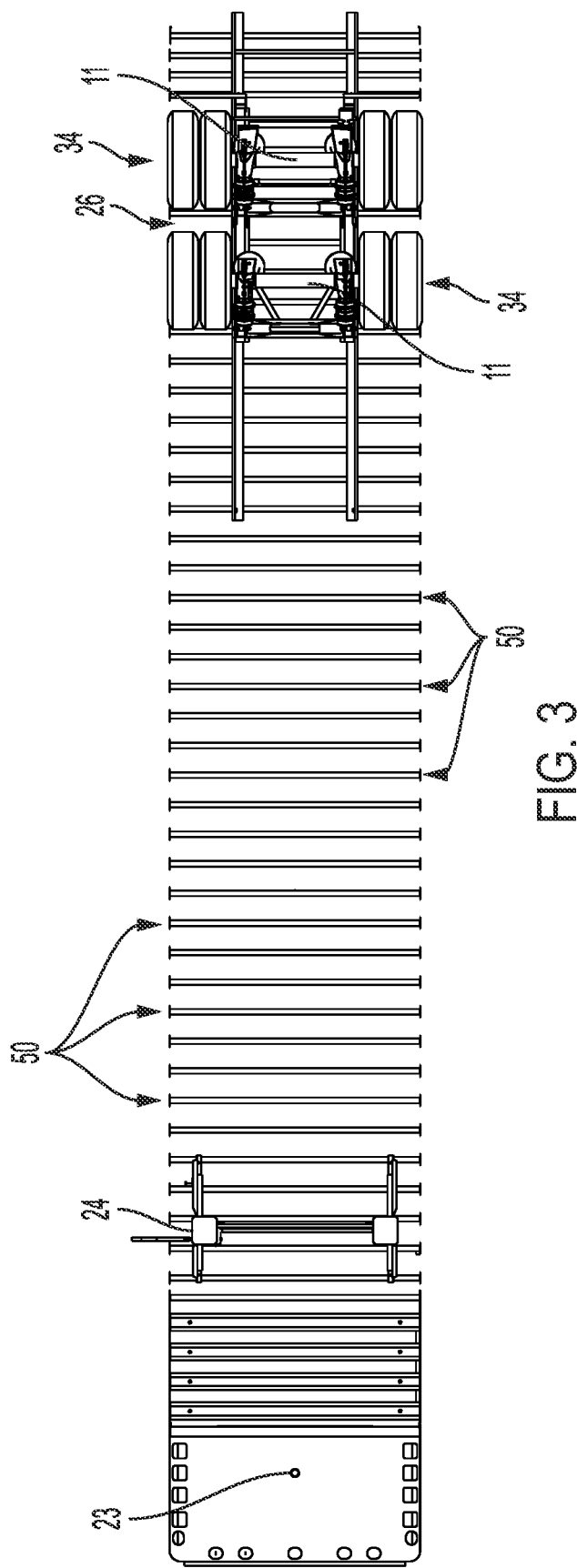
FIG. 3 is a partial bottom view of a chassis of the trailer as in FIG. 1, below the cargo deck and omitting the bottom rails.
Figure 4:
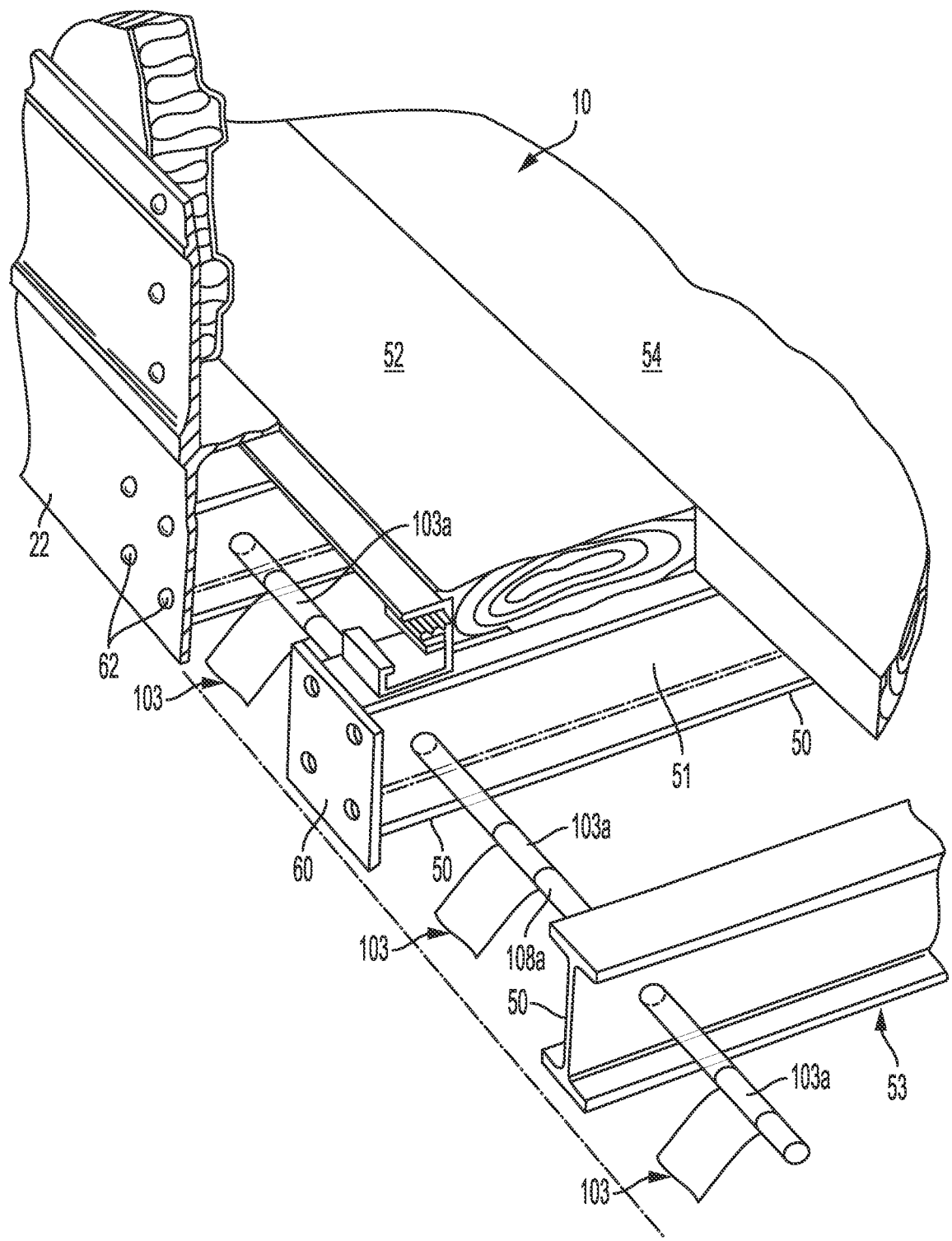
FIG. 4 is a cutaway, partial perspective view of the trailer as in FIG. 1.
Figure 5:
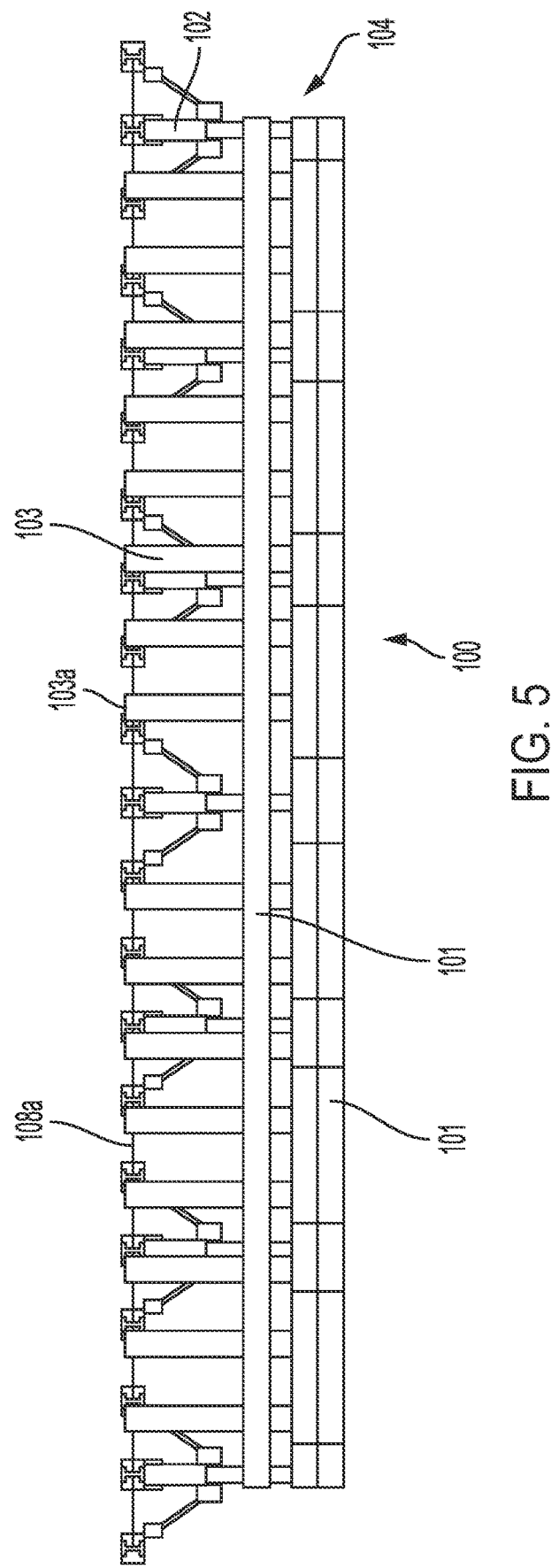
FIG. 5 is a plan view of one side of the underride guard assembly of the trailer as in FIG. 1.
Figure 6:
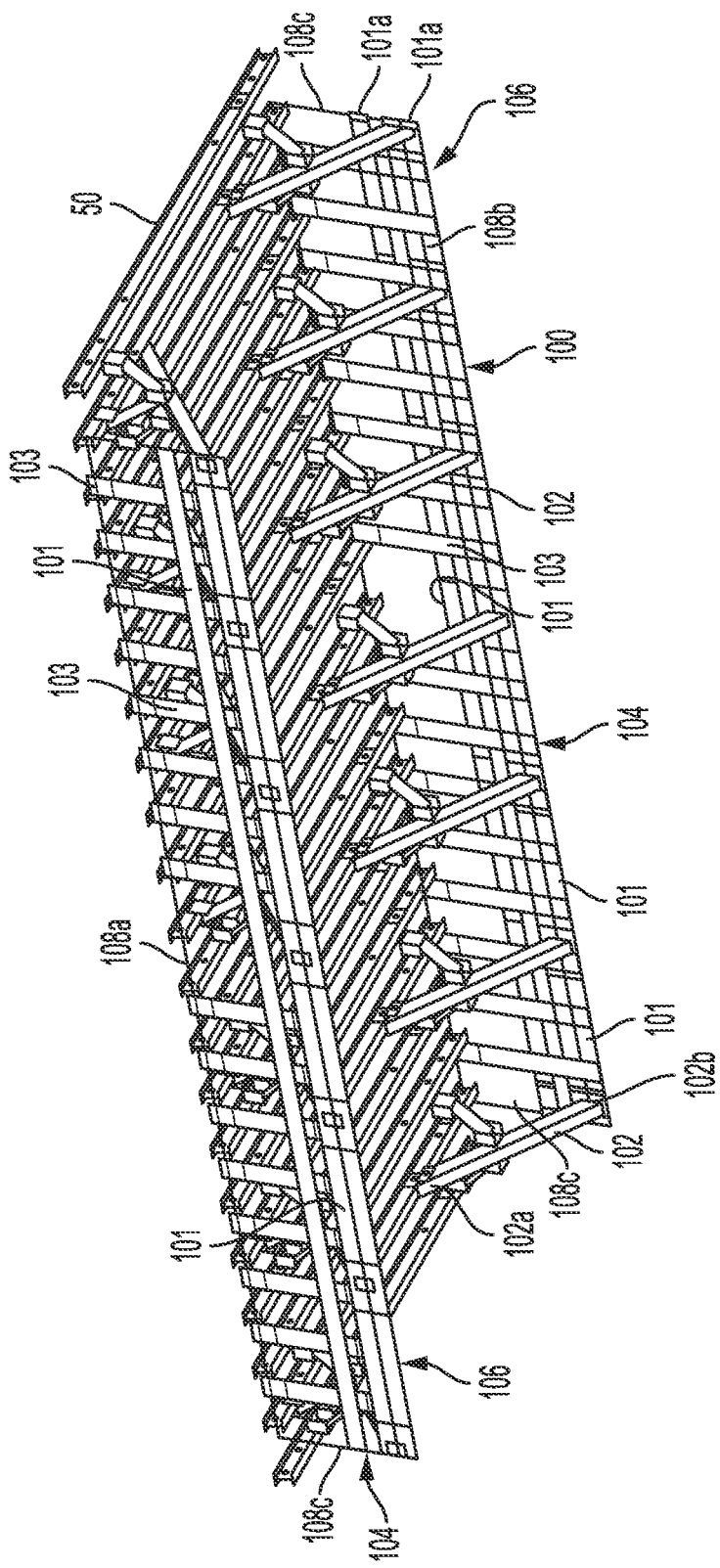
FIG. 6 is a perspective view of the underride guard assembly of the trailer as in FIG. 1, illustrating two rails attached to opposite ends of cross members of the trailer's chassis.

Referring now to FIGS. 1, 5, and 6, an example embodiment of a side underride guard assembly 100 may be utilized with semi-trailer trucks having a tractor (not shown) and a semi-trailer 8, an example of which is shown in FIGS. 1 through 4. Referring to FIGS. 1-4, trailer 8 may have a floor or cargo deck 10, two side walls 12 on opposing sides of the trailer and attached to opposing sides of floor 10, and a roof 16. Opposing side walls 12 may be identically constructed, though mirror images of each other. Roof 16 (which may comprise one or more roof sheets supported by roof bows) may be attached to side walls 12 by top rails 18, and each side wall may be attached to floor 10 by a respective bottom rail 22 (one of which is shown in FIG. 1). Trailer 8 may include retractable legs 24, a forward end wall 26, and a rear end frame 28. Once assembled, the roof, floor, and side walls form a trailer that may have a generally rectangular (which may include a square) cross-section when viewed from the rear.

Each of a pair of doors 30 at the trailer's rearward end may be pivotably connected to rear end frame 28, although the trailer may have a single roll-up door in other embodiments, as should be understood in this art. A plurality of wheels 34 support the trailer's rearward end and facilitate the semi-trailer's movement when coupled to a tractor (not shown). Wheels 34 may rotate about axes defined by a plurality of axles 11 (FIG. 3) that extend transverse to the longitudinal dimension of the trailer and transfer the load from the cargo on the cargo deck, through the trailer's wheeled chassis 9 to the wheels. More specifically, the axles may support a suspension system, or "bogie" 13, for example an air ride suspension or a leaf spring system that is attached to longitudinally extending slide rails upon which the suspension elements are adjustably attached and that attach to the floor's support cross members 50 (FIGS. 3 and 4) so that load from the cargo interior transfers to the axles and the wheels from the axles' attachment to the support members via the suspension. As should be understood, the trailer's wheels 34, axles 11, and suspension comprise the trailer's running gear. A front end of the semi-trailer may include a kingpin 23 that is configured to engage the trailer with a fifth wheel (not shown) of the tractor. The fifth wheel may include a flat plate that is typically greased so that a lower surface of the trailer slides against an upper surface of the fifth wheel. A fifth wheel coupling enables the trailer to pivot in the horizontal plane with respect to the tractor.

Each side wall 12 of trailer 8 may include a plurality of vertical posts 36, a plurality of interior side wall liner panels 38, and one or more scuff bands 40. The liner panels may interconnect the posts, and the scuff band may be received within a recessed portion of a bottom portion of posts 36. Each post may include a longitudinal front face through which is defined a series of apertures 42 for receipt of cargo straps and the like to secure the trailer contents disposed on the cargo deck. Panels 38 may be fastened to posts 36 by screws, rivets, or any other suitable method. The panels may be constructed of plywood or other suitable materials, for example steel or polymer. In one embodiment, the panels may comprise corrugated metal panels including a plurality of recessed channels that give the panels added structural strength and stiffness. Posts 36 may be fastened to top rail 18 by suitable means such as rivets, screws or the like. Thus, the panels may be secured to the top rail though their connections to the posts. An outer skin 21 may be fastened to the trailer's top and bottom rails. The portion of the top rail to which the posts are fastened may extend behind liner panels 38.

As illustrated in FIG. 1, trailer 8 may be elongated in the dimension indicated at 3 extending from the trailer's forward end wall 26 to its rear frame 28 (and vice versa). As illustrated in FIGS. 3 and 4, the deck assembly may include a floor or cargo deck 10 and a plurality of elongated support members 50, for example I-beams, the longitudinal dimensions of which extend transverse to a vertical plane, indicated at 5, that includes longitudinal dimension 3 and that generally bisects the trailer body and wheeled chassis. Each support member 50 may be connected at its opposing ends to respective trailer bottom rails 22 on the two opposing trailer sides, and the support members and bottom rails may be considered part of the trailer's wheeled chassis. The floor may comprise a series of parallel longitudinal floorboards including an edge plank 52 and inner planks 54 extending side-by-side across the trailer and secured to I-beam support members 50 by bolts or other materials and methods as should be understood in the art. Each I-beam support member 50 may include an end plate 60 welded to each end, and end plates 60 may be fastened to a bottom portion of bottom rail 22 via, for example, rivets 62.

As should be understood, the van type trailer discussed above has a monocoque construction, so that the trailer body is part of the trailer's wheeled chassis 9, i.e. that part of the trailer that transfers load from the cargo deck to and through the wheels. In other types of trailers, e.g. platform trailers, the wheeled chassis comprises a wheeled frame supporting a cargo deck, upon which the load is disposed. It should be understood that various types of trailers are encompassed by the present disclosure and that the monocoque embodiments discussed herein do not limit the present disclosure.

Figure 7:
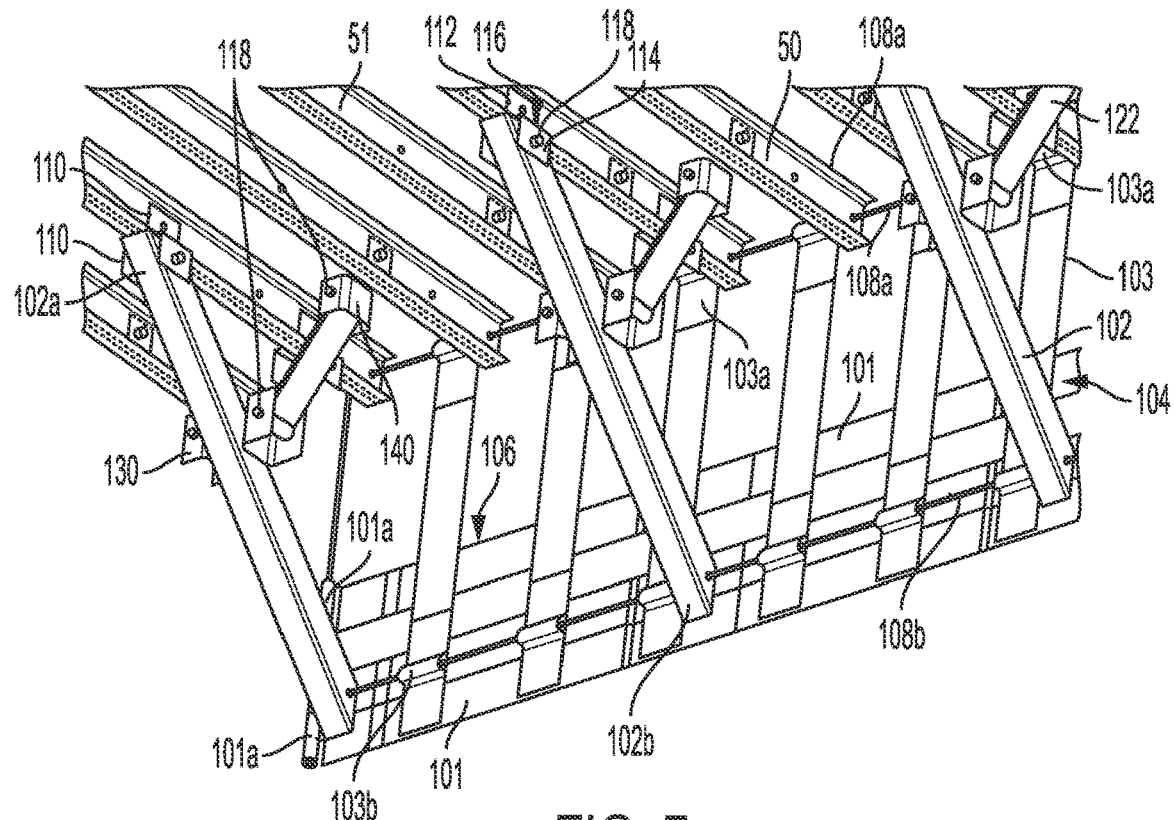
FIG. 7 is a perspective view of a portion of the underride guard assembly of the trailer as in FIG. 1.
Figure 8:
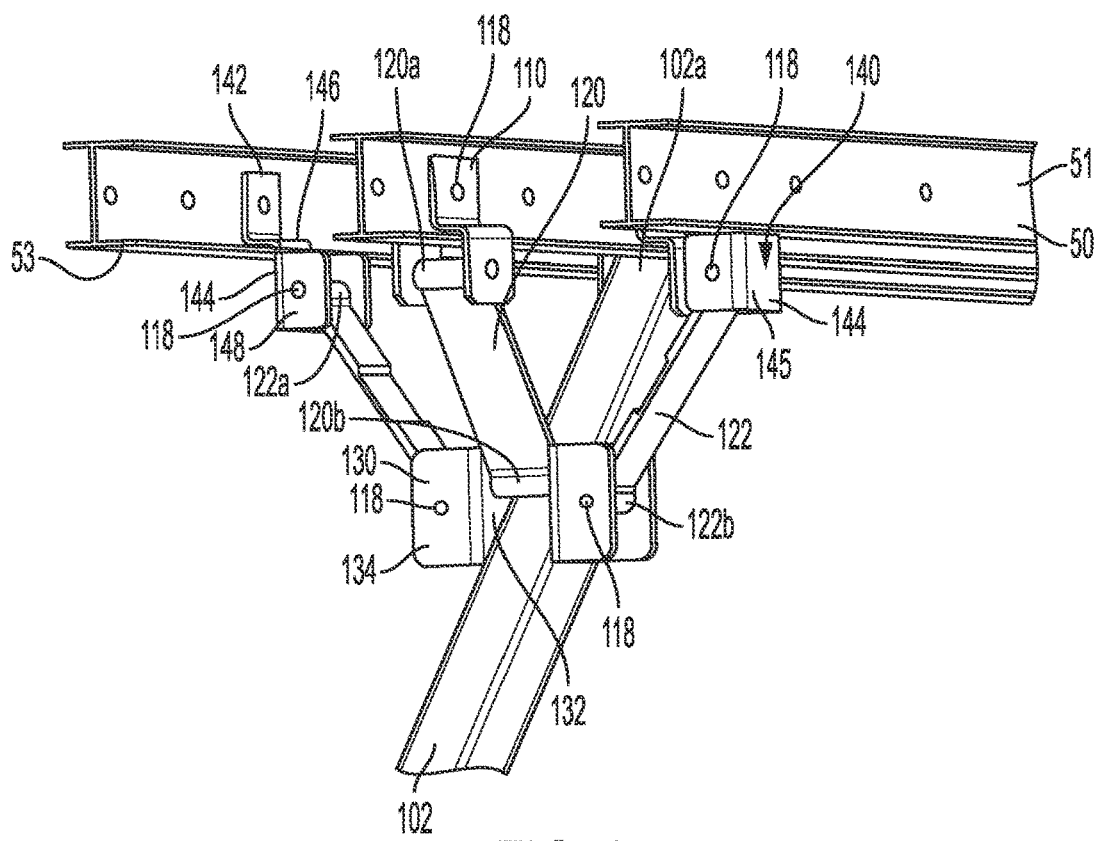
FIG. 8 is a partial perspective view of the underride guard assembly of the trailer as in FIG. 1.

As illustrated in FIGS. 5, 6, 7, and 8, an underride guard assembly 100 in accordance with an embodiment of the present disclosure may include a pair of impact absorber assemblies 104 on opposite sides of the trailer, each including a plurality of elongated brace members 102. Each elongated brace member is pivotably attached to wheeled chassis 9 (FIG. 2), in this embodiment via attachment to a respective transverse support member 50 of the trailer's wheeled chassis. Each impact absorber assembly 104 also includes a webbing net 106 and a support cable 108 made, for example, of about 0.5" diameter steel. As illustrated in FIG. 7, a first end 102a of each elongated brace member 102 may be pivotably attached to the corresponding support member 50 by a pair of S-shaped brackets 110. Each S-shaped bracket 110 may include an upper portion 112 and a lower portion 114 that are connected by a center portion 116 that is transverse to both the upper and lower portions. Upper portion 112 may be substantially planar and secured to web 51 of support member 50 by a nut and bolt fastener 118. A pair of S-shaped brackets 110 may be secured to respective opposite surfaces of the corresponding support member 50 by a single nut and bolt fastener 118 passing through the upper portions 112 of the two opposing brackets 110 and the support member web 51 and secured in place by a washer/nut assembly, although multiple nut and bolt fasteners may be used. Another nut and bolt fastener 118 may pass through apertures defined in each of the two opposing lower portions of the opposing brackets 110 and through a first end 102a of a corresponding one of the brace members 102. A through-hole through the web of I-beam brace member 102 through which the bolt of bolt fastener 118 passes may be slightly larger than the bolt's outer diameter, so that the brace member is pivotable about the axis defined by the bolt and thereby pivotably secured to the support member and, thereby, to the wheeled chassis.

Figure 2:
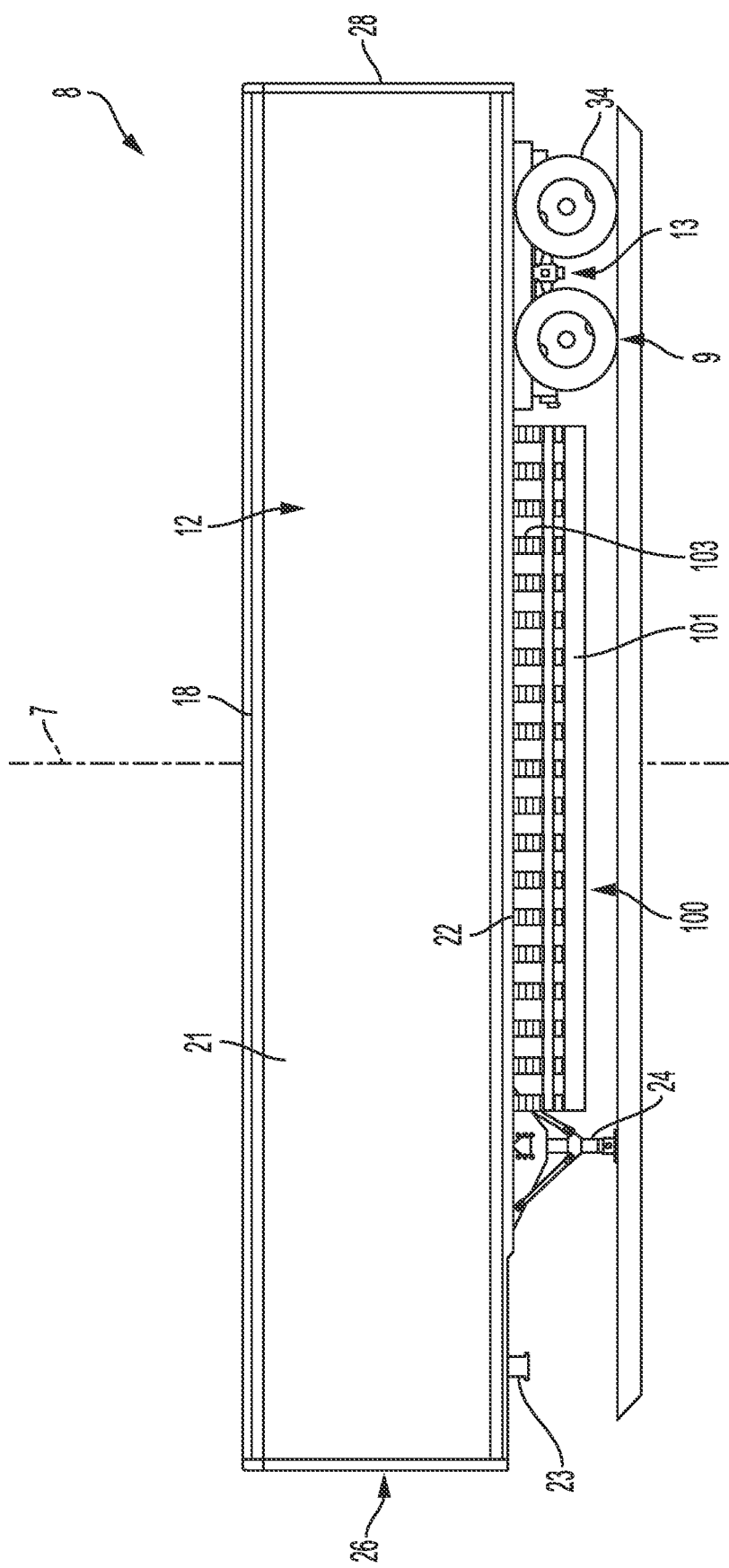
FIG. 2 is a side view of the trailer as in FIG. 1.

In the illustrated embodiment, and with additional reference to FIG. 9, each brace member 102 may be secured to the corresponding support member 50 so that an edge surface of first end 102a of brace member 102 seats flush against a bottom surface 53 of support member 50. Referring also to FIG. 10, each brace member 102 may be pivotable about the through-bolt of the lower nut and bolt fastener 118 of the bracket 110 attaching the brace member to the support member upwardly and away from plane 5 (FIG. 1) and toward the bottom surface of the trailer in reaction to an upward force 137 applied to second end 102b of brace member 102, for example as the trailer crosses over a rail road or other raised obstacle that may rise between the tractor's rear wheels (not shown) and wheels 34 (FIG. 2). The outward corner of brace member first end 102a (not shown but behind lower portion 114 of bracket 110 in FIGS. 9 and 10) may be cut off at a diagonal to facilitate such rotational movement with respect to bottom surface 53, opening a gap 129 between bottom surface 53 and the edge surface of front end 102a. In other embodiments, a slight gap 129 may be provided between bottom surface 53 and the edge surface of first end 102a when the brace member is in the position as shown in FIG. 9.

In the presently illustrated embodiment, each brace member 102 may be normally disposed (in response to gravity) in a position as illustrated in FIG. 9, in which each brace member 102, and in particular the generally planar upper surface thereof, defines an internal angle 131 of about 45° with bottom surface 53 of the corresponding support member 50 (which, for such purpose, may be considered the bottom of the trailer). In other embodiments, the defined angle may be within a range of about 30° to about 60°, though it should be understood that other angle ranges for the brace member's normal position may be selected. Referring to FIG. 10, angle 131 decreases as upward force 137, e.g. as applied by a railroad crossing as the trailer moves over the crossing, causes (through the force's application to the rail to which the brace member is attached, as discussed below) the brace member to pivot upward (and away from the wheeled chassis' center, as indicated in the figures by plane 5, FIG. 1) about the bolt axis of lower nut and bolt fastener 118. As the elongated bolts of the lower nut and bolt fasteners 118 of first ends 102a of the brace members of the same impact absorber assembly are axially aligned with each other, those bolts define a common axis about which the impact absorber assembly (and, in particular, the brace members thereof) rotates, as described herein and illustrated, e.g. at FIG. 11.

In the event of an underride event, in which the force of a vehicle impact (indicated at 135 in FIG. 9) engages the rail (discussed below) laterally, e.g. coming from right-to-left in the perspective of FIG. 9 as indicated at 135, the lateral force applied to the brace member is transmitted to the trailer and its chassis through the connections, including attachments and direct engagements, between the brace members and the transverse support members 50, for example one or more of the abutting engagement between the edge surface of first end 102a and bottom surface 53 of its corresponding transverse support member 50 (where no gap is provided between the surfaces in the position of FIG. 9), bracket 110 and its through-bolts (where such gap is provided) that attach the brace member to its corresponding support member, and the straps between the brace members and the support members, as discussed below. Such communication between the brace members and their corresponding and adjacent support members thereby allows each brace member to transfer its received impact load directly to its corresponding support member and the support members adjacent to it. Thus, one or more of the engagement of brace members 102 with lower surfaces 53 of their corresponding transverse support members 50, the attachment of brace members 102 to support members 50 via brackets 110, and the attachment of the brace members to the support members through the straps form a stop between impact absorbing assemblies 104 and the trailer, e.g. its wheeled chassis, that blocks each impact absorbing assembly and its rail from pivoting inward toward the trailer's or chassis' center in response to impact of an upward force (e.g. from a railroad crossing) 137 or a lateral impact force 135 (which may also include an upward component). In the illustrated embodiment, each impact absorber assembly 104 may include seven brace members 102 per trailer side, or the overall underride guard assembly includes fourteen brace members for the trailer. In other embodiments, each impact absorber assembly may include any number of brace members, and all such possibilities are intended to be within the spirit and scope of the present disclosure.

Referring to FIGS. 7, 8, 9, 10, and 11, first end 102a of each brace member 102 may be further connected to the trailer and its wheeled chassis by a center (first) strap 120 and a pair of side (second) straps 122. Similarly to the first end of brace member 102, a first end 120a of center strap 120 may be secured to the corresponding support member 50 by a pair of opposing S-shaped brackets 110. A second end 120b of center strap 120 may be secured to brace member 102 by a pair of C-shaped brackets 130, each C-shaped bracket 130 including a base wall 132 and a pair of parallel side walls 134 extending outwardly therefrom, away from brace member 102. As shown, base wall 132 of each C-shaped bracket 130 may be welded or bolted to a corresponding side wall of brace member 102. A nut and bolt fastener 118 may be supported between base walls 132 of the C-shaped brackets 130 and may be the attachment point for securing second end 120b of center strap 120 to brace member 102. For example, each strap 120 and 122 may define loops at each opposing end thereof through which respective bolts pass to secure the strap to its brackets, as described herein.

Each C-shaped bracket 130 may also secure a second end 122b of a corresponding side strap 122 to brace member 102 on a nut and bolt fastener 118 that is supported between the side walls 134 of each C-shaped bracket 130. A first end 122a of each side strap 122 may be secured to a support member 50 of the trailer chassis adjacent to the support member to which its corresponding brace member is attached by a combination bracket 140 including an upper portion 142, a C-shaped lower portion 144, and a center portion 146 extending therebetween. Bracket C-shaped portion 144 has a pair of side walls 148 extending outwardly from parallel edges of a back wall 145 of C-shaped lower portion 144. Upper portion 142 of each combination bracket 140 may be secured to a corresponding web 51 of an adjacent support member 50 of the trailer chassis, and a nut and bolt fastener 118 may be supported between side walls 148 of each combination bracket 140 for supporting a first end 122a of the corresponding side strap 122. In the illustrated embodiments, each of elongated center strap 120 and side straps 122 may form an internal angle (measured from the strap's upper surface when extended along its elongation dimension) of about 45° with the general plane of the bottom surfaces 53 of the support members. As should be understood, such angles in other embodiments may vary, for example within the range of about 30° to about 60°, for example depending on the lateral spacing of the support members. In certain embodiments, center straps 120 and side straps 122 may be comprised of nylon or a polyester composite, for example as used in cargo tie-down straps and having a load limit of about 5,400 pounds and are about 3.0" wide and up to 0.1" thick, for example about 0.075" thick. It should be understood, however, that the present disclosure is not limited to such material and that other materials may be used.

Side straps 122 attached to a given brace member, being in opposition to one another on the brace member's opposing sides, may restrain the brace member's lateral movement (i.e. in either direction in the trailer's longitudinal dimension 3 (FIG. 1), in this embodiment) that might tend to break or damage the brace member's pivotal attachment to the wheeled chassis at brackets 110 (FIGS. 9 and 10). In this embodiment, center strap 120, alone or in combination with an edge surface 133 of brace member first end 102a blocks the brace member's pivotal movement about the lower bolt (of lower nut and bolt fastener 118) toward plane 5 (FIG. 1) in response to a lateral (right-to-left as viewed in FIG. 9) force and/or downward force applied to the brace member's second end, for example in a side impact event, as indicated at 135. The center and side straps, alone or in combination with edge surface 133, may be considered a stop that blocks the brace member's rotation toward the trailer center (as represented by plane 5, FIG. 1). As the inelasticity of side straps 122 may also resist or block undesired lateral movement of the brace member (in the trailer's longitudinal dimension) with respect to its pivotal attachment to the chassis, so the inelasticity of center and side straps 120 and 122 resists or blocks the brace member's undesired pivotal movement about that pivotal attachment toward the trailer center, and straps 120 and 122 may also be considered part of the stop. The center strap's and side straps' flexibility, or low rigidity, however, permits the brace member to pivot away from the trailer center without obstruction from the straps.

As illustrated in the present Figures, straps 120 and 122 of these embodiments are elongated and may be generally planar in their dimensions transverse to their elongation dimensions. At each end of each strap, the strap may fold around and may be stitched or otherwise adhered to itself to form a through-hole through which a corresponding bolt of nut and bolt fastener 118 passes, as discussed above. Each strap through-hole may be slightly larger in diameter than the bolt's outer diameter, so that the strap can pivot about the bolt. In some embodiments, bearing sleeves or bushings may be provided about the bolts to facilitate this relative rotation. Each bolt may be disposed horizontally on the trailer. Because the connection of brackets 130 on opposing sides of brace member 102 may be disposed at a distance from the brace member's pivotal attachment to its corresponding support member 50, brackets 140 may be disposed further outward on their support members than are brackets 110.

As illustrated in FIGS. 6 and 7, web net 106 of each of the two impact absorber assemblies 104 of underride guard assembly 100 may include a plurality of horizontally elongated webs 101 that are attached to a plurality of vertically elongated webs 103, such as by stitching, and secured both to support members 50 of trailer 8 (FIGS. 1 and 2) and second ends 102b of brace members 102 by cable 108. Referring additionally to FIG. 4, cable 108 may form a continuous loop with an upper portion 108a that extends through apertures defined in webs 51 of the trailer's support members 50, a lower portion 108b that extends through apertures defined in second ends 102b of each brace member 102, and side portions 108c extending vertically therebetween. Upper portion 108a of cable 108 may extend through an upper portion 103a of each vertical web; lower portion 108b of cable 108 may extend through a lower portion 103b of each vertical web 103; and side portions 108c of cable 108 may extend through corresponding opposed end portions 101a of horizontal webs 101, in each instance through a full or half loop formed by the web by an end thereof folded over and stitched or otherwise attached to itself, thereby securing webbing net 106 to trailer 8 and the wheeled chassis thereof.

Each impact absorber assembly 104 of underride guard assembly 100 may extend vertically beneath floor 10 of trailer 8 adjacent a corresponding side wall 12 thereof and may extend along the side wall from a position at, near, or rearward of retractable support legs 24 (FIG. 2) to a position at, near, or proximately forward of the front of wheels 34, as best seen in FIG. 2. However, in certain embodiments as used on vehicles as discussed herein or on other vehicles, underride guard assembly may be positioned at any number of alternate positions. In certain embodiments, horizontal webs 101 and vertical webs 103 may be formed by nylon or polyester composite materials typically used in cargo straps, with the webs being about 4.0" in width and up to 0.1" thick, e.g. about 0.075" thick. The polyester composite material forming horizontal webs 101 and vertical webs 103 in the presently described embodiments have a load limit of about 5400 pounds, though it should be understood that other materials, with other load limits, may be used in other embodiments. The flexibility of the web net allows the rail of the impact absorber assembly to flex inward, toward the trailer center, upon a side vehicle impact.

Although only one of the two impact absorber assemblies 104 is illustrated in FIGS. 1 and 2, it should be understood that two identically constructed, but mirror image, impact absorber assemblies 104 extend beneath respective sides of the trailer and its chassis (see FIG. 6). In each example assembly, the combination of the two or more horizontal webs 101 and the lower horizontal portion 108b of wire 108, supported by the vertical webs 103, define a horizontally elongated rail attached to the second ends of the brace members. As discussed above, the horizontal rail in these embodiments may extend almost the entire distance between the trailer wheels and the retractable support legs (when considered along the edge of the trailer side in the trailer's longitudinal dimension), and in certain embodiments may extend at least over half that distance on each side of the trailer (those distances may be aligned with each other across the two sides) and pass through a center position of the trailer as indicated in FIG. 2 by a plane 7 (coming into and out of the page of the view of FIG. 2) transverse to longitudinal dimension 3 and plane 5 (FIG. 1) and disposed midway between the trailer's forward end wall and its rear frame.

Figure 11:
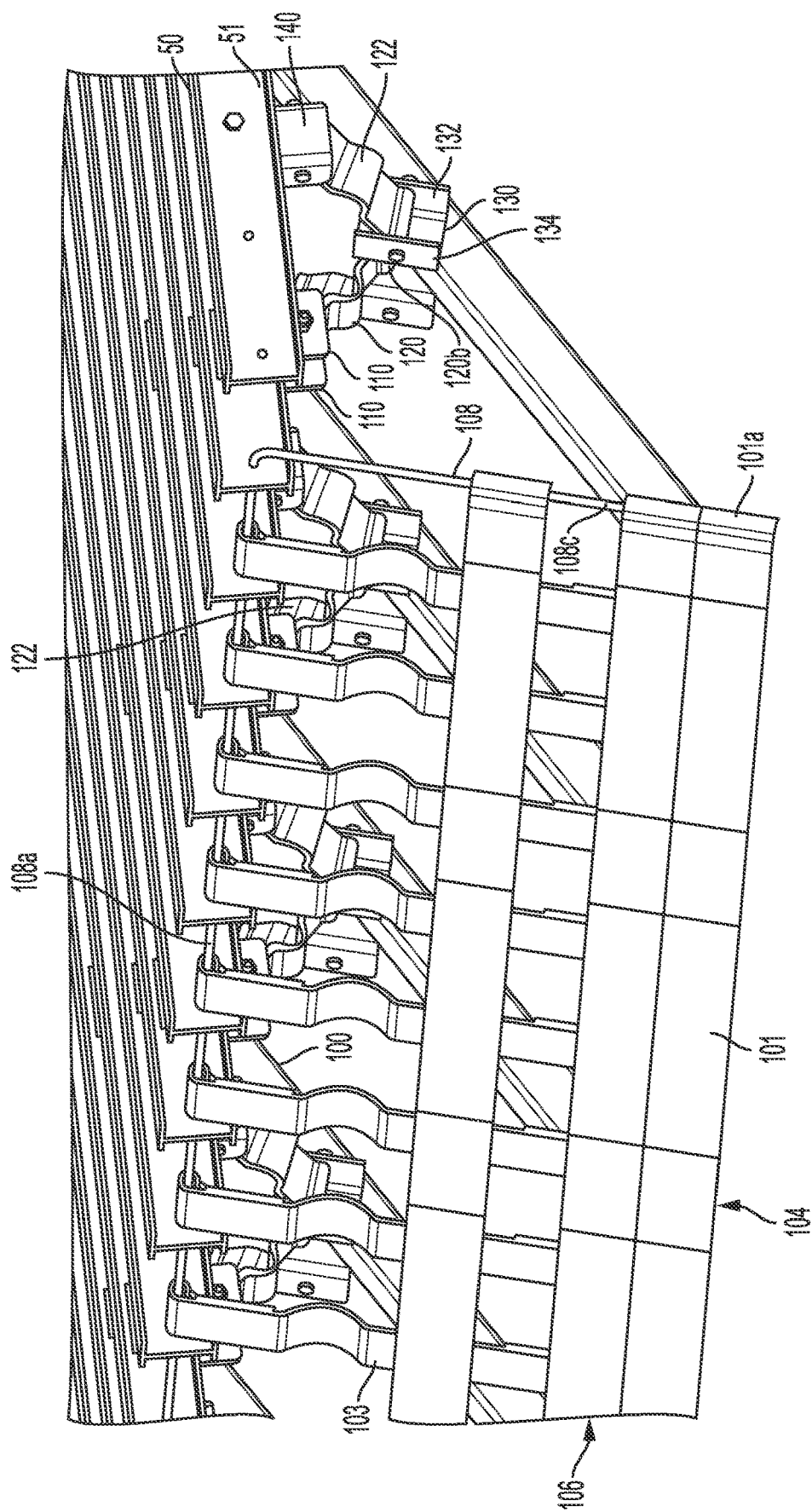
FIG. 11 is a partial perspective view of the underride guard assembly as in FIG. 1, illustrating a rail thereof pivoting upward with respect to the trailer chassis and away from the trailer center.

In operation, if an upward force 137 (FIG. 9) is applied to either or both of the rails on the two trailer sides, e.g. simultaneously because the trailer is traversing a rail crossing or other barrier between the tractor wheels and the trailer wheels, that upward force may be applied to the rails across the entirety or a lesser portion of either or each rail's length, e.g. crossing center plane 7. As this happens, the rail(s) receiving the upward force may pivot upward away from their normal gravity-driven (first) position (e.g. as shown in FIG. 9) and outward, away from the trailer center plane 5 (FIG. 1), toward an upward (second) position (e.g. as shown in FIGS. 10 and 11). In the present embodiments, the rail may be flexible, so that as such a force travels down the rail's(s') length, the rail may deform to a degree between adjacent brace members, but nonetheless as referenced herein the rail(s) has reached the second position above the first position as a result of the upward force. In the presently-described embodiments, the trailer includes no structure beneath the upwardmost possible, or upwardmost expected, travel of the two rails, so that the trailer defines a clearance across the entire width of the trailer underside and between the rails below such upwardmost limit (or predetermined expectation) of the rail's upward pivotal travel and along the entire lengths of the two rails in the trailer's longitudinal dimension 3 or, in other embodiments, at least half of the rails' lengths, e.g. including across plane 7. This allows the rails to pivot upward in response to a rail crossing or other obstacle, and move over such obstacle, without damaging other parts of the trailer as the rails slide over the obstacle and return (by gravity) to their first positions once the obstacle has been passed.

It should be understood that the impact absorber assembly rails of the illustrated embodiments are presented for purposes of example, not limitation. Thus, for example, the rails may be formed of a rigid material, such as aluminum or steel tubing, and may be formed in a variety of geometries. For example, rather than extending continuously horizontally, the rails may be formed by tubes or other structures disposed in their elongation dimensions at an acute angle with respect to horizontal but in a criss-crossed pattern that itself extends horizontally along the trailer side's length.

Figure 12:
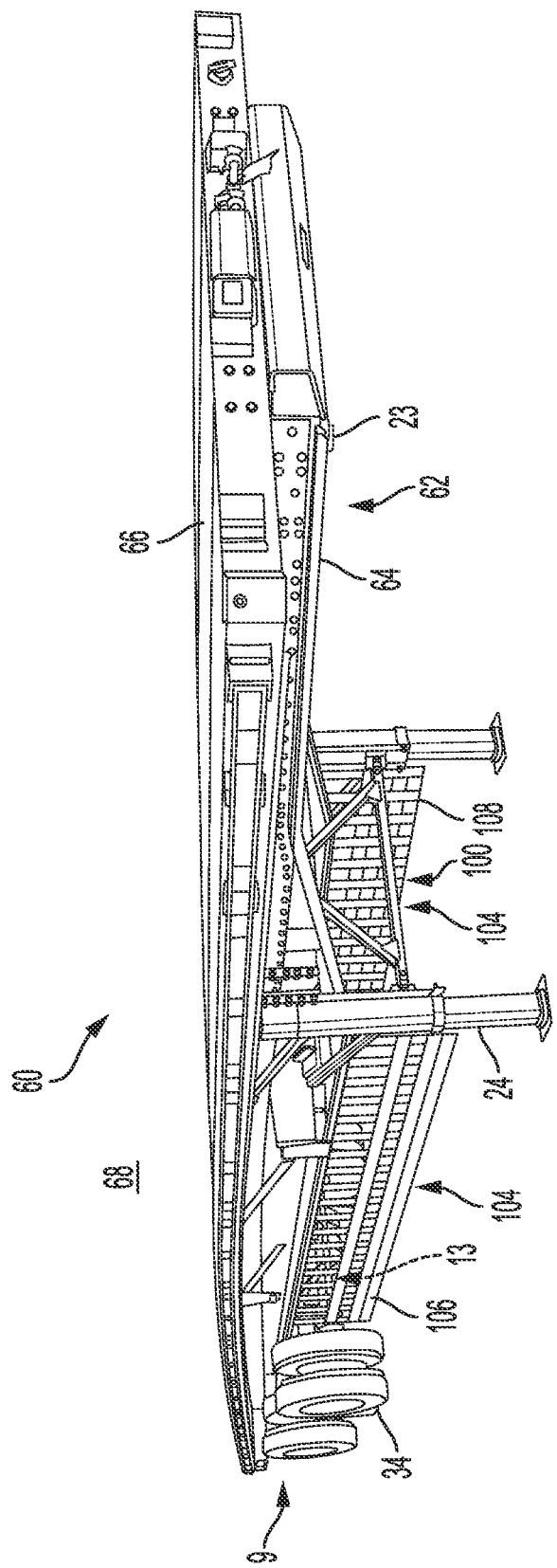
FIG. 12 is a perspective view of an embodiment of a semi-trailer in accordance with the present disclosure.

Referring also to FIG. 12 with regard to an embodiment of a platform trailer 60, the trailer's wheeled chassis 9 may include a frame 62 comprising a pair of longitudinal I-beams 64 (one of which is shown in FIG. 12) extending front-to-back underneath a cargo deck 66 and cross members disposed between the longitudinal I-beams and the floor, and cargo area 68 may be considered the open area immediately above the cargo deck 66. In such an arrangement, the floor decking may be considered the trailer body, while the longitudinal I-beams, transverse support members under the floor decking, and the side rails may be considered part of the wheeled trailer chassis. Frame 62 may be supported by a pair of opposing retractable legs 24 or other support at the trailer's forward end and at the trailer's rear by a suspension or bogie 13 that supports eight wheels 34 rotatably disposed on a pair (or more) of axles (with four wheels to each of the two axles) extending laterally across the trailer's width beneath the floor. Accordingly, the frame, front legs, suspension, and wheels may comprise a wheeled chassis that supports a cargo area, which may be defined by an enclosed body attached to the frame or may be defined by an open area above a platform trailer deck. Previously discussed embodiments of underride guard assembly 100 and its impact absorber assemblies 104 may be secured to the transverse support members of platform trailers 60 in the manner discussed above. For example, the cable loop (108) may again attach a web net 106 to respective second ends of a plurality of brace members (not shown, for purposes of illustration, in FIG. 12) that are pivotably attached to the trailer cross members at their opposing first ends, in a manner as described above with regard to van-type embodiments of FIGS. 6-8. Thus, it should be understood that while the van-type trailers discussed herein are provided for purposes of example, other types of semi-trailers or other trailers may be used in the context of the present disclosure.

While one or more embodiments of the disclosure are described above, it should be appreciated by those skilled in the art that various modifications and variations can be made in the present disclosure without departing from the scope and spirit thereof. Accordingly, it should be understood that the elements of one embodiment may be combined with another embodiment to create a still further embodiment. It is intended that the present disclosure cover such modifications and variations as come within the scope and spirit of the present disclosure, the appended claims, and their equivalents.

What is claimed is:

1. A semi-trailer, comprising:
 a wheeled chassis having a forward end, a rearward end, a first side extending between the forward end and the rearward end, a second side extending between the forward end and the rearward end opposite the first side, at least one wheeled axle at the rearward end, and a retractable support at the forward end, wherein the wheeled chassis is elongated in a longitudinal dimension from the forward end to the rearward end;
 a cargo deck supported by the wheeled chassis;
 an underride guard assembly attached to the wheeled chassis and comprising at least one first rail disposed below the first side within a first space located forward of wheels of the at least one wheeled axle and rearward of the retractable support,
 wherein the at least one first rail extends over at least half of the distance between the wheels and the retractable support in the longitudinal dimension, and
 wherein the at least one first rail is pivotably attached to the wheeled chassis so that the at least one first rail is pivotable, from a first position with respect to the wheeled chassis and away from a center of the wheeled chassis between the first side and the second side, upon application of an upward force to the at least one first rail and is pivotable back to the first position in absence of the upward force to the at least one first rail; and
 a stop disposed operatively between the at least one first rail and the wheeled chassis so that the stop blocks the at least one first rail from pivoting inward from the first position toward the center in response to application of a force to the at least one first rail that is transverse to the longitudinal dimension and toward the center.

2. The semi-trailer as in claim 1, wherein the underride guard assembly comprises at least one second rail disposed below the second side within a second space located forward of the wheels and rearward of the retractable support, wherein the at least one second rail extends over at least half of the distance between the wheels and the retractable support in the longitudinal dimension, and wherein the at least one second rail is pivotably attached to the wheeled chassis so that the at least one second rail is pivotable, from a second position with respect to the wheeled chassis and away from the center of the wheeled chassis, upon application of an upward force to the second rail and is pivotable back to the second position in absence of the upward force to the second rail.

3. A semi-trailer, comprising:
 a wheeled chassis having a forward end, a rearward end, a first side extending between the forward end and the rearward end, a second side extending between the forward end and the rearward end opposite the first side, at least one wheeled axle at the rearward end, and a retractable support at the forward end, wherein the wheeled chassis is elongated in a longitudinal dimension from the forward end to the rearward end;
 a cargo deck supported by the wheeled chassis; and
 an underride guard assembly attached to the wheeled chassis and comprising
  an elongated first brace member and an elongated second brace member, each having a first end pivotably attached to the wheeled chassis and a second end opposite the first end, wherein each of the first brace member and the second brace member extends from the first end thereof to the second end thereof downwardly from the wheeled chassis and outwardly away from a center of the wheeled chassis between the first side and the second side,
  a rail extending between the second ends of the first brace member and the second brace member,
  wherein each of the first brace member and the second brace member is pivotable upwardly about an axis passing through the first end of the first brace member and the first end of the second brace member,
  a first stop disposed operatively between the first brace member and the wheeled chassis so that the first stop blocks the first brace member from pivoting downward about the axis and toward the center in response to a force to the first brace member that is transverse to the longitudinal dimension and toward the center, and
  a second stop disposed operatively between the second brace member and the wheeled chassis so that the second stop blocks the second brace member from pivoting downward about the axis and toward the center in response to a force to the second brace member that is transverse to the longitudinal dimension and toward the center.

4. The semi-trailer as in claim 3, wherein the wheeled chassis has a plurality of elongated support members that extend across the wheeled chassis transverse to the longitudinal dimension and that support the cargo deck, and wherein each of the first brace member and the second brace member is pivotably attached to a corresponding said support member.

5. The semi-trailer as in claim 3, comprising a body disposed on the wheeled chassis, wherein the body encloses a cargo area above the cargo deck.

6. The semi-trailer as in claim 3, wherein the wheeled chassis and the cargo deck comprise a platform trailer.

7. The semi-trailer as in claim 3, wherein the first brace member and the second brace member are tubular.

8. The semi-trailer as in claim 3, wherein the first brace member and the second brace member each has a substantially-rectangular cross-section.

9. The semi-trailer as in claim 4, wherein each of the first brace member and the second brace member forms an interior angle with the corresponding support members of the wheeled chassis in a range between about 30° to about 60°.

10. A semi-trailer, comprising:
a wheeled chassis having a forward end, a rearward end, a first side extending between the forward end and the rearward end, a second side extending between the forward end and the rearward end opposite the first side, at least one wheeled axle at the rearward end, and a retractable support at the forward end, wherein the wheeled chassis is elongated in a longitudinal dimension from the forward end to the rearward end;
a cargo deck supported by the wheeled chassis; and
an underride guard assembly attached to the wheeled chassis and comprising
an elongated first brace member and an elongated second brace member, each having a first end pivotably attached to the wheeled chassis and a second end opposite the first end, wherein each of the first brace member and the second brace member extends from the first end thereof to the second end thereof downwardly from the wheeled chassis and outwardly away from a center of the wheeled chassis between the first side and the second side, and
a rail extending between the second ends of the first brace member and the second brace member,
wherein each of the first brace member and the second brace member is pivotable upwardly about an axis passing through the first end of the first brace member and the first end of the second brace member, and
wherein the rail is a cable.

11. The semi-trailer as in claim 10, wherein the cable is disposed in a loop having a lower portion extending between the second ends of the first brace member and the second brace member, an upper portion extending between ends of the support members to which the first brace member and the second brace member are attached, and side portions extending between the upper portion and the lower portion.

12. The semi-trailer as in claim 11, wherein the cable passes through apertures defined in the second end of the first brace member, the second end of the second brace member, and the ends of the support members to which the first brace member and the second brace member are attached.

13. The semi-trailer as in claim 11, the underride guard assembly further comprising at least one horizontally elongated first web connected to, and extending between, the second end of the first brace member and the second end of the second brace member.

14. The semi-trailer as in claim 13, the underride guard assembly further comprising at least one vertically elongated second web connected to, and extending between, the upper portion and the lower portion of the loop, the at least one first web and the at least one second web being affixed to each other.

15. A semi-trailer, comprising:
a wheeled chassis having a forward end, a rearward end, a first side extending between the forward end and the rearward end, a second side extending between the forward end and the rearward end opposite the first side, at least one wheeled axle at the rearward end, and a retractable support at the forward end;
a cargo deck supported by the wheeled chassis, wherein the wheeled chassis has a plurality of elongated support members that extend across the wheeled chassis transverse to the longitudinal dimension and that support the cargo deck; and
an underride guard assembly attached to the wheeled chassis and comprising
an elongated first brace member and an elongated second brace member, each having a first end pivotably attached to a corresponding said support member and a second end opposite the first end, wherein each of the first brace member and the second brace member extends from the first end thereof to the second end thereof downwardly from the wheeled chassis and outwardly away from a center of the wheeled chassis between the first side and the second side,
a rail extending between the second ends of the first brace member and the second brace member,
wherein each of the first brace member and the second brace member is pivotable upwardly about an axis passing through the first end of the first brace member and the first end of the second brace member
a first, and
a second strap,
wherein each of the first strap and the second strap has a first end secured to a corresponding one of the first brace member and the second brace member and a second end secured to a corresponding one of the support members to which the first brace member and the second brace member are attached.

16. A semi-trailer, comprising:
a wheeled chassis having a forward end, a rearward end, a first side extending between the forward end and the rearward end, a second side extending between the forward end and the rearward end opposite the first side, at least one wheeled axle at the rearward end, and a retractable support at the forward end, wherein the wheeled chassis is elongated in a longitudinal dimension from the forward end to the rearward end;
a cargo deck supported by the wheeled chassis; and
an underride guard assembly comprising
an elongated first brace member and an elongated second brace member, each having a first end pivotably attached to the wheeled chassis and a second end opposite the first end, wherein each of the first brace member and the second brace member extends from the first end thereof to the second end thereof downwardly from the wheeled chassis and outwardly away from a center of the wheeled chassis between the first side and the second side, and
at least one horizontally elongated web connected to and extending between the second ends of the first brace member and the second brace member,
wherein each of the first brace member and the second brace member is pivotable upwardly about an axis passing through the first end of the first brace member and the first end of the second brace member,
a first stop disposed operatively between the first brace member and the wheeled chassis so that the first stop blocks the first brace member from pivoting downward about the axis and toward the center in response to a force to the first brace member that is transverse to the longitudinal dimension and toward the center, and
a second stop disposed operatively between the second brace member and the wheeled chassis so that the second stop blocks the second brace member from pivoting downward about the axis and toward the center in response to a force to the second brace member that is transverse to the longitudinal dimension and toward the center.

17. The semi-trailer as in claim 16, wherein the at least one horizontally elongated web comprises a plurality of horizontally elongated webs.

18. The semi-trailer as in claim 16, wherein the wheeled chassis has a plurality of elongated support members that extend across the wheeled chassis transverse to the longitudinal dimension and that support the cargo deck, and wherein each of the first brace member and the second brace member is pivotably attached to a corresponding said support member.

19. The semi-trailer as in claim 16, comprising a body dispersed on the wheeled chassis, wherein the body encloses a cargo area above the cargo deck.

20. The semi-trailer as in claim 16, wherein the wheeled chassis and the cargo deck comprise a platform trailer.

21. A semi-trailer, comprising:
a wheeled chassis having a forward end, a rearward end, a first side extending between the forward end and the rearward end, a second side extending between the forward end and the rearward end opposite the first side, at least one wheeled axle at the rearward end, and a retractable support at the forward end, wherein the wheeled chassis is elongated in a longitudinal dimension from the forward end to the rearward end;
a cargo deck supported by the wheeled chassis; and
an underride guard assembly comprising
an elongated first brace member and an elongated second brace member, each having a first end pivotably attached to the wheeled chassis and a second end opposite the first end, wherein each of the first brace member and the second brace member extends from the first end thereof to the second end thereof downwardly from the wheeled chassis and outwardly away from a center of the wheeled chassis between the first side and the second side,
at least one horizontally elongated web connected to and extending between the second ends of the first brace member and the second brace member, and
at least one vertically elongated web connected to, and extending between, one of the first side and the second side and the at least one horizontally elongated web,
wherein each of the first brace member and the second brace member is pivotable upwardly about an axis passing through the first end of the first brace member and the first end of the second brace member.

22. The semi-trailer as in claim 21, wherein the at least one vertically elongated web comprises a plurality of vertically elongated webs.

23. A semi-trailer, comprising:
a wheeled chassis having a forward end, a rearward end, a first side extending between the forward end and the rearward end, a second side extending between the forward end and the rearward end opposite the first side, at least one wheeled axle at the rearward end, and a retractable support at the forward end, wherein the wheeled chassis is elongated in a longitudinal dimension from the forward end to the rearward end;
a cargo deck supported by the wheeled chassis, wherein the wheeled chassis has a plurality of elongated support members that extend across the wheeled chassis transverse to the longitudinal dimension and that support the cargo deck; and
an underride guard assembly comprising
an elongated first brace member and an elongated second brace member, each having a first end pivotably attached to a corresponding said support member and a second end opposite the first end, wherein each of the first brace member and the second brace member extends from the first end thereof to the second end thereof downwardly from the wheeled chassis and outwardly away from a center of the wheeled chassis between the first side and the second side,
at least one horizontally elongated web connected to and extending between the second ends of the first brace member and the second brace member, and
a cable disposed in a loop having a lower portion extending between the second ends of the first brace member and the second brace member, an upper portion extending between ends of the support members to which the first brace member and the second brace member are attached, and side portions extending between the upper portion and the lower portion,
wherein each of the first brace member and the second brace member is pivotable upwardly about an axis passing through the first end of the first brace member and the first end of the second brace member.

24. The semi-trailer as in claim 23, wherein the cable passes through apertures defined in the second end of the first brace member, the second end of the second brace member, and the ends of the support members to which the first brace member and the second brace member are attached.

* * * * *

UNITED STATES PATENT AND TRADEMARK OFFICE
CERTIFICATE OF CORRECTION

PATENT NO. : 11,738,704 B2
APPLICATION NO. : 17/216002
DATED : August 29, 2023
INVENTOR(S) : Christian S. Lee et al.

It is certified that error appears in the above-identified patent and that said Letters Patent is hereby corrected as shown below:

In the Claims

In Claim 15, Column 14, Line 22, after "a first", please add the word --strap--.

Signed and Sealed this
Sixteenth Day of April, 2024

Katherine Kelly Vidal
*Director of the United States Patent and Trademark Office*